United States Patent
Kluge

(10) Patent No.: US 12,512,638 B2
(45) Date of Patent: Dec. 30, 2025

(54) BASEBOARD APPARATUS FOR AN ELECTRICAL INSTALLATION

(71) Applicant: Dr. Ing. h.c. F. Porsche Aktiengesellschaft, Stuttgart (DE)

(72) Inventor: Marc Kluge, Besigheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 317 days.

(21) Appl. No.: 18/211,333

(22) Filed: Jun. 19, 2023

(65) Prior Publication Data
US 2023/0420897 A1    Dec. 28, 2023

(30) Foreign Application Priority Data
Jun. 27, 2022  (DE) .............. 10 2022 115 942.6

(51) Int. Cl.
*H01R 27/02*   (2006.01)
*H01R 13/502*  (2006.01)

(52) U.S. Cl.
CPC ........... *H01R 27/02* (2013.01); *H01R 13/502* (2013.01)

(58) Field of Classification Search
CPC .... H01R 27/02; H01R 13/502; H01R 25/142; H02G 3/105; H02G 3/0425
See application file for complete search history.

(56) References Cited

U.S. PATENT DOCUMENTS

| | | | |
|---|---|---|---|
| 4,717,982 A * | 1/1988 | Toreson | G11B 33/124 439/942 |
| 2023/0420897 A1* | 12/2023 | Kluge | H02G 3/105 |

FOREIGN PATENT DOCUMENTS

| | | |
|---|---|---|
| DE | 29821304 U1 | 4/2000 |
| DE | 102007020958 A1 | 11/2008 |
| DE | 202007017216 U1 | 4/2009 |
| DE | 102011012884 B3 | 7/2012 |
| DE | 102012015542 A1 | 2/2014 |
| EP | 2034569 A1 | 3/2009 |
| EP | 3454432 A1 | 3/2019 |

* cited by examiner

*Primary Examiner* — Abdullah A Riyami
*Assistant Examiner* — Nader J Alhawamdeh
(74) *Attorney, Agent, or Firm* — Buchanan Ingersoll & Rooney PC

(57) ABSTRACT

A baseboard apparatus for an electrical installation. The baseboard apparatus includes a rail device attachable to a wall structure and connectable to a power supply network using longitudinal contact bars. A placement device is attachable to the rail device using socket units and frame units. The socket units are contactable by the contact bars at various longitudinal positions on the rail device. The frame units can be mounted on the rail device in order to cover the rail device outside the socket units. The rail device includes a data transmission bar connectable to a data network. The placement device includes data transfer interfaces, which are contactable at various longitudinal positions of the rail device by the data transfer bar.

9 Claims, 1 Drawing Sheet

BASEBOARD APPARATUS FOR AN ELECTRICAL INSTALLATION

CROSS-REFERENCE TO RELATED APPLICATION

This application claims priority to German Patent Application No. 10 2022 115 942.6, filed Jun. 27, 2022, the content of such application being incorporated by reference herein in its entirety.

FIELD OF THE INVENTION

The present invention relates to a baseboard apparatus for an electrical installation comprising at least one rail device attachable to a wall structure and connectable to a power supply network and comprising at least one placement device attachable to the rail device. The rail device comprises longitudinally extending contact bars. The placement device comprises socket units and frame units. The socket units are contactable with the contact bars at various longitudinal positions of the rail device. The frame units are mountable on the rail device for the purpose of covering.

BACKGROUND OF THE INVENTION

For example, a power rail designed as a baseboard is disclosed in DE 298 21 304 U1, which is incorporated by reference herein. A plurality of electrical leads are arranged within the power rail, which are configured by means of an adapter for power consumption. The adapter is inserted into the power rail so that an engaging part of the adapter is in contact with the electrical leads. The electrical leads are protected against the environment by means of a soft lip.

EP 2 034 569 A1, which is incorporated by reference herein, discloses a baseboard with permanently integrated outlets. The unneeded outlets are designed to be coverable.

Known from EP 3 454 432 A1, which is incorporated by reference herein, is a channel system, which can be designed as a socket bar and comprises a plurality of electrical leads. A current lead and a neutral lead run within a common channel, while a ground lead, or rather a protective lead, is housed within its own channel and designed as a rail. At regular intervals, outlets are arranged on the conduit system.

DE 10 2007 020 958 A1, which is incorporated by reference herein, describes a function box comprising an outlet and/or a light switch and/or a port for data communication. The function box is connectable to a baseboard. The baseboard includes at least one data line and is designed as a floor-to-ceiling post in one embodiment.

SUMMARY OF THE INVENTION

In view of the foregoing, described herein is a baseboard apparatus enabling an inconvenient electrical installation that can be implemented with a large degree of freedom.

The baseboard apparatus according to aspects of the invention is provided for an electrical installation. In the context of the present invention, an electrical installation is also understood to be a (data) network installation. The baseboard apparatus comprises at least one rail device, which is mountable to a wall structure and connectable to a power supply network. The rail device comprises longitudinally extending contact bars. The baseboard apparatus comprises at least one placement device attachable to the rail device (at any longitudinal position). The placement device comprises socket units, in particular for electrical power supply and frame units. The socket units are contactable with the contact bars at various, and in particular any, longitudinal positions on the rail device. The frame units are mountable on the rail device in order to cover the rail device (adjacent to the socket units). The rail device comprises at least one data transmission bar, which can be connected to a data network. The placement device comprises data transfer interfaces, which are contactable at various, and in particular any, longitudinal positions on the rail device by the at least one data transfer bar.

The baseboard apparatus according to aspects of the invention offers many advantages. One significant advantage is provided by the integration of the data transfer bar and the data transfer interfaces. Doing so enables a particularly fast and uncomplicated electrical installation for both the power supply and for data transmission. Installation effort and installation space are reduced or saved as a result. The integration of the data transfer into the rail device also enables a particularly high degree of freedom for the arrangement of the data transfer interfaces. For example, the data transmission interfaces can be arranged at any position of the rail device.

In one advantageous configuration, the at least one data transmission interface is integrated into (each) at least one socket unit of the plurality of socket units. In particular, the data transfer interface is housed within a housing body of the socket unit. The housing body can in particular be attached to the rail device at any longitudinal position of the rail device. Additionally or alternatively, the placement device can comprise separately designed data transmission interfaces and separately designed socket units. In particular, the data transfer interface and the socket bodies are then housed within separate housings.

Preferably, the outlet units each comprise contact elements. Preferably, the data transfer interface comprises at least one contact unit. In particular, the contact elements are in contact with the contact bars when the socket units are attached to the rail device. In particular, the contact unit is in contact with the data transmission bar when the data transmission interface is attached to the rail device. In particular, the contact elements and the contact units are in contact with the contact bars or with the data transmission bar prior to their attachment or at the same time as they are attached to the rail device and, e.g., inserted therein.

In particular, the baseboard apparatus is designed to be mounted along an inner edge of the wall structure. In particular, the baseboard apparatus is mountable along an inner edge between a horizontal wall (or floor) and a vertical wall of the wall structure.

In one advantageous configuration, the rail device has a wedge-shaped cross-sectional structural shape. In particular, the wedge-shaped cross-sectional structural shape is designed to be attachable to both vertical and horizontal walls. In particular, a rail body has said wedge-shaped cross-sectional structural shape.

It is preferred and advantageous that the wedge-shaped cross-sectional structural shape comprise a base side and two leg sides that are transverse to the base side. The base side is in particular designed to receive the placement device. In particular, the receptacle units and/or the data transfer interfaces and/or the frame units are attached to the base side. In particular, the leg sides can be attached to a wall of the wall structure, where the walls are transverse and preferably perpendicular to each other.

In one advantageous continuing further development, the placement device, preferably the socket units and/or the data transfer interface and/or the frame units, can only be indirectly attached to the wall structure via the rail device. It is also possible that the placement device at least in part be separately attached to the wall structure. The placement device is preferably attachable to the rail device and in particular to its rail body.

In one advantageous configuration, it is provided that the placement device, in particular the socket units and/or the frame units and/or the data transfer interface, comprises a base body attachable to the rail device and two support legs projecting from the base body. In particular, the support legs are supported on the wall structure and preferably outside the rail device on the wall structure. The support legs preferably support each other on a wall of the wall structure when the walls run transversely and in particular perpendicular to each other.

In all configurations, it is particularly preferred that the frame units and/or the socket units and/or the data transfer interface can be mounted and/or disassembled on the rail device when the rail device is attached to the wall structure. In particular, the frame units can be divided, shortened, or equipped with a recess, so that at least one outlet unit and/or at least one data transfer interface can be installed between two frame units or in one frame unit.

In particular, the placement device, preferably the socket units and/or the frame units and/or the data transmission interfaces, can be attached to the rail device at any longitudinal position of the rail device. In addition to being attached to the rail device, the placement device can also be attachable to the wall structure.

The frame units serve in particular for at least a partial covering of the rail device on the portions not covered by the socket units. The frame units can in particular be mounted to the rail device and in particular to the rail body, as desired. In particular, at least the portions between the outlet devices and/or the data transfer interfaces are covered by frame units.

The data transfer interfaces are in particular at least partially designed as sockets, into which corresponding plugs can be inserted. The data transfer interfaces can also be provided at least in part with an electronic unit for wireless data transfer. Then, for example, the data transfer interface connects to a terminal via a wireless communication standard so that data is transferable. It is possible that the data transfer interfaces be designed at least in part for electrical power supply, in particular in the low voltage range (USB power supply; Power over Ethernet, PoE).

In particular, at least one contact bar is provided for each lead or contact of the socket unit. In particular, at least three contact bars are provided. For example, at least one contact bar is provided for the phase or the outer lead and the neutral lead as well as the ground lead. In particular, the contact bars are insulated from each other. In particular, the socket units comprise or are designed as at least one (grounded) socket.

In particular, the data transmission bar comprises at least one and preferably at least two or a plurality of leads. In particular, the data transfer bar comprises at least one lead for every data transfer interface lead or contact. In particular, the leads are insulated and/or shielded from each other. It is also possible that a separate data transfer bar be provided for every lead or contact. It is possible that the data transmission bar be provided at least in part by means of at least one of the contact bars. For example, the contact bar is then used for both data transfer and power supply. It is also possible, however, that the data transfer bar and the contact bars be designed separately.

In particular, the rail device comprises at least one rail body, via which the contact bars and/or the data transmission bar is received. The rail body can have an integral or also a multipart design. In particular, the rail body is designed to be attached to the wall structure. In particular, the contact bars and/or the data transmission bar and/or the frame units are indirectly attached to the wall structure via the rail body. The contact bars and/or the data transmission bar and/or the frame units can also be received on a separate rail body.

BRIEF DESCRIPTION OF THE DRAWINGS

Further advantages and features of the present invention follow from the embodiment examples, which are explained hereinafter with reference to the accompanying figures.

DETAILED DESCRIPTION OF THE INVENTION

Figure 1:
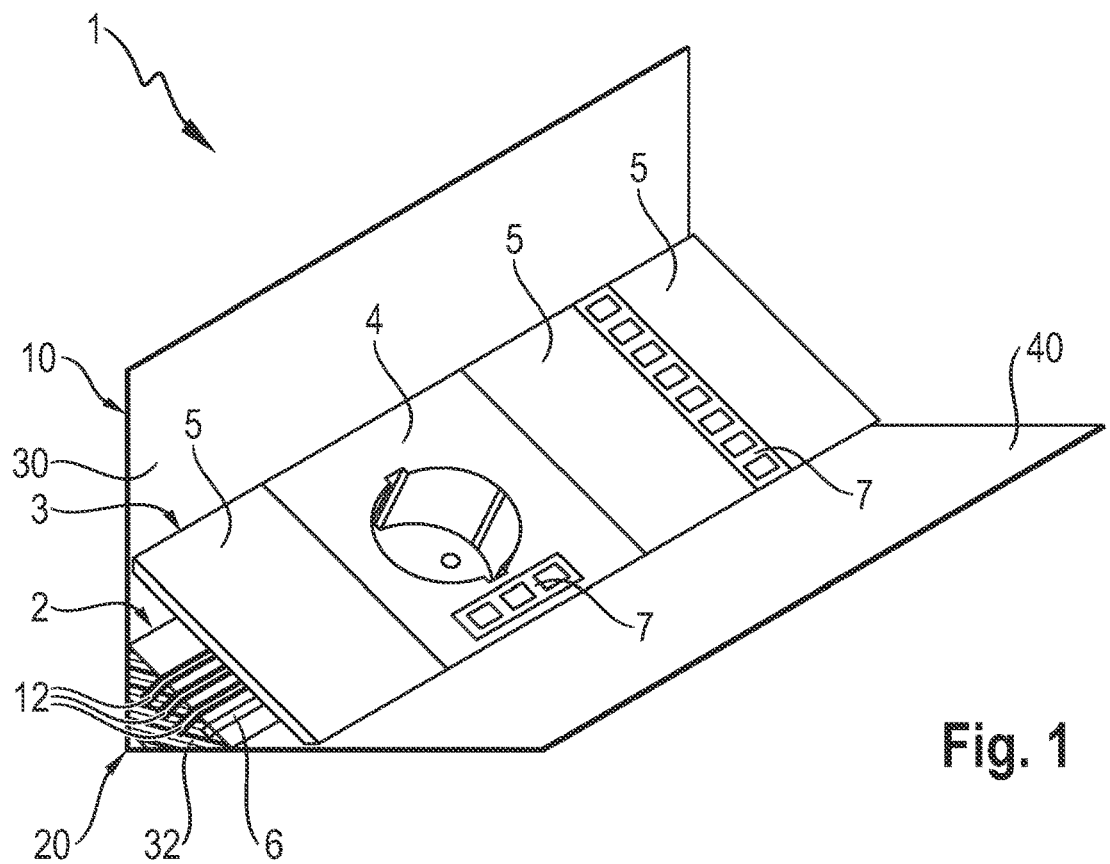
FIG. 1 depicts a highly schematic representation of a baseboard apparatus according to aspects of the invention in a perspective view from obliquely above.
Figure 2:
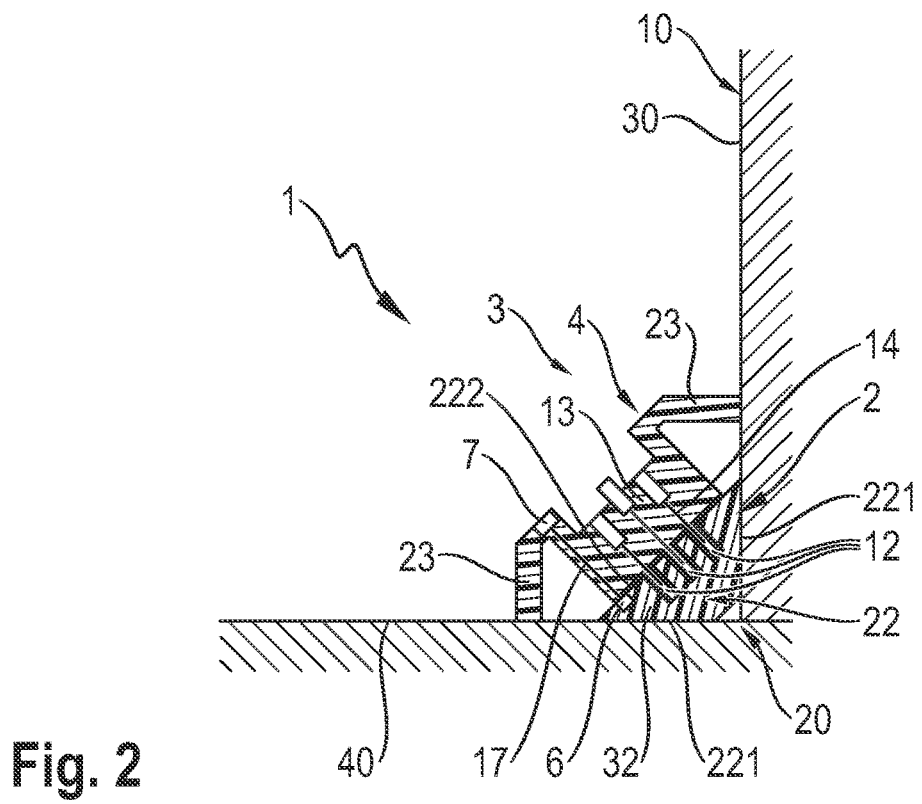
FIG. 2 depicts the baseboard apparatus shown in FIG. 1 in a sectional side view.

FIGS. 1 and 2 show a baseboard apparatus 1 according to aspects of the invention for an electrical installation, which is mounted in this case along an inner edge 20 of a wall structure 10 and connected to a power supply system. The wall structure 10 here comprises a vertical wall 30 and a horizontal wall 40 or floor. The wall structure 10 is part of a building, e.g., a living room. However, the wall structure 10 can also be part of a vehicle and, e.g., a passenger compartment or other body structure, or also a piece of furniture or the like.

The baseboard apparatus 1 comprises a rail device 2 with three contact bars 12 extending in the longitudinal direction and a data transfer bar 6 extending in the longitudinal direction. The contact bars 12 and the data transmission bar 6 are in this case received on a rail body 32. The rail device 2 is attached to the wall structure 10 via the rail body 32.

A placement device 3 can be attached to the rail device 2, which placement device is provided by way of socket units 4 and frame units 5 as well as data transfer interfaces 7. For ease of reference, only a portion of the baseboard apparatus 1 is shown by way of example in this case, which apparatus comprises only one socket unit 4 and two data transfer interfaces 7 and three frame units 5. For example, the baseboard apparatus 1 can extend a length of several meters and can have correspondingly many socket units 4 and frame units 5, as well as data transfer interfaces 7.

The socket unit 4 is in this case designed as a protective contact socket with an outer lead or phase and a zero lead as well as a ground lead. Accordingly, the rail device 2 is equipped with three contact bars 12, so that a contact bar 12 is provided for the outer lead, the neutral lead, and the ground lead. The socket unit 4 is in electrical contact with the contact bars 12 via a contact element 14. For example, the contact elements 14 are designed as pins.

The socket units 4 are contactable by the contact bars 12 at any longitudinal position of the rail device 2. A socket unit 4 can thus be installed at any location along the longitudinal axis of the baseboard apparatus 1, or retrofitted as needed. Only the shield unit 5 need be divided or shortened for this purpose. The new socket unit 4 is then placed between the frame units and is contacted by the corresponding contact bars 12 via the contact elements 14.

In addition to the power supply via the socket units 4, the baseboard apparatus 1 presented herein also offers an economical and particularly flexible connection to a data network. For this purpose, the data transmission bar 6 is connected to the data network. The data transfer interfaces 7 are designed as LAN or USB sockets, for example, or the like, and are contacted by the data transfer bar 6 via contact units 17.

For example, the data transfer bar 6 can be equipped with several leads (not shown in this case). For example, the number of leads is adapted according to the number of leads in the data transfer interface 7. The contact unit 17 then provides a separate contacting and, e.g., one pin for each lead provided.

As previously described for the outlet units 4, the data transfer interfaces 7 are also contactable by the data transfer bar 6 via the contact units 17 at any longitudinal position. For example, new network outlets can be retrofitted without the need for interference with wall structure 10 or new electrical installations or visually less appealing exposed installation solutions.

In the embodiment example shown herein, a data transfer interface 7 is integrated into the socket unit 4. The socket unit 4 and the data transmission interface 7 can thus be installed or retrofitted together and in a single operation.

The other data transfer interface 7 is designed in this case to be separate from the socket unit 4. In order to retrofit a data transfer interface 7, only the frame unit 5 need be divided or equipped with a recess. The new data transfer interface 7 can then be inserted and attached to the rail body 32, as well as contacted by the data transfer bar 6 via the contact unit 17.

The rail device 2 in this case comprises a rail body with a wedge-shaped cross-sectional structural shape 22. The cross-sectional structural shape 22 has a base side 220 and two transverse leg sides 221. As can be seen in FIG. 2, the placement device 3 and, e.g., the socket unit 4 are mounted on the base side 220. In the intended assembly state, the leg sides 221 then each abut a wall 30, 40.

For example, the placement device 3 and in this case the socket unit 4 comprises a base body 13, which can be attached to the rail device 2 and in particular to the base side 220 thereof. The placement device 3 and the socket unit 4 in this case also comprises two support legs 23 projecting from the base body 13, which legs are supported outside the rail device 2 on the walls 30, 40.

What is claimed is:

1. A baseboard apparatus for an electrical installation, said baseboard apparatus comprising:
   at least one rail device attachable to a wall structure and connectable to a power supply network using longitudinally extending contact bars, wherein the rail device comprises at least one data transmission bar connectable to a data network; and
   at least one placement device attachable to the rail device using socket units and frame units, wherein the socket units are contactable by the contact bars at various longitudinal positions on the rail device, wherein the frame units are mountable on the rail device in order to cover the rail device outside of the socket units, and wherein the at least one placement device comprises data transmission interfaces contactable by the data transmission bar at various longitudinal positions on the rail device,
   wherein the socket units each comprise contact elements, and the data transmission interfaces each comprise at least one contact unit, and wherein the contact elements are contacted by the contact bars and the contact units are contacted by the data transmission bar when the socket units and the data transmission interfaces are properly attached to the rail device.

2. The baseboard apparatus according to claim 1, wherein the data transmission interfaces are integrated into at least one of the socket units.

3. The baseboard apparatus according to claim 1, wherein the baseboard apparatus is configured to be assembled along an inner edge of the wall structure.

4. The baseboard apparatus according to claim 1, wherein the at least one rail device has a wedge-shaped cross-sectional structural shape.

5. The baseboard apparatus according to claim 1, wherein the placement device is only indirectly attachable to the wall structure via the rail device.

6. The baseboard apparatus according to claim 1, wherein the frame units and the socket units and the data transmission interfaces are mountable and removable on the rail device when the rail device is attached to the wall structure.

7. A baseboard apparatus for an electrical installation, said baseboard apparatus comprising:
   at least one rail device attachable to a wall structure and connectable to a power supply network using longitudinally extending contact bars, wherein the rail device comprises at least one data transmission bar connectable to a data network; and
   at least one placement device attachable to the rail device using socket units and frame units, wherein the socket units are contactable by the contact bars at various longitudinal positions on the rail device, wherein the frame units are mountable on the rail device in order to cover the rail device outside of the socket units, and wherein the at least one placement device comprises data transmission interfaces contactable by the data transmission bar at various longitudinal positions on the rail device,
   wherein the at least one rail device has a wedge-shaped cross-sectional structural shape,
   wherein the wedge-shaped cross-sectional structural shape comprises a base side and two leg sides that are transverse to the base side, and wherein the base side is configured to receive the at least one placement device, and wherein the leg sides are each abuttable to a wall of the wall structure when the walls of the wall structure extend transversely to each other.

8. A baseboard apparatus for an electrical installation, said baseboard apparatus comprising:
   at least one rail device attachable to a wall structure and connectable to a power supply network using longitudinally extending contact bars, wherein the rail device comprises at least one data transmission bar connectable to a data network; and
   at least one placement device attachable to the rail device using socket units and frame units, wherein the socket units are contactable by the contact bars at various longitudinal positions on the rail device, wherein the frame units are mountable on the rail device in order to cover the rail device outside of the socket units, and wherein the at least one placement device comprises data transmission interfaces contactable by the data transmission bar at various longitudinal positions on the rail device,
   wherein the socket units and/or the frame units comprise(s) a base body attachable to the rail device and two support legs projecting from the base body, which support legs are supportable on the wall structure outside of the rail device.

9. The baseboard apparatus according to claim 8, wherein the support legs support each other on a wall of the wall structure when the walls of the wall structure are transverse to each other.

* * * * *